United States Patent
Smaardijk et al.

[11] Patent Number: 6,143,860
[45] Date of Patent: Nov. 7, 2000

[54] POLYKETONE POLYMER COMPOSITION

[75] Inventors: Abraham Adriaan Smaardijk; Hendrik De Wit, both of Amsterdam, Netherlands

[73] Assignee: Shell Oil Company, Houston, Tex.

[21] Appl. No.: 09/163,078

[22] Filed: Sep. 29, 1998

[30] Foreign Application Priority Data

Feb. 24, 1998 [EP] European Pat. Off. ............. 98301330

[51] Int. Cl.⁷ ............. C08G 10/00; C08G 8/02; C08G 8/18
[52] U.S. Cl. ............. 528/220; 528/127; 528/100; 528/125; 528/126; 528/206; 525/328.6; 525/471; 525/539; 524/151; 524/194; 524/222; 524/291; 524/356
[58] Field of Search ............. 528/220, 100, 528/125, 126, 127, 206; 524/151, 194, 222, 291, 356; 525/328.6, 471, 539

[56] References Cited

U.S. PATENT DOCUMENTS

| | | | |
|---|---|---|---|
| 4,960,808 | 10/1990 | Schmitter | 524/151 |
| 5,763,512 | 6/1998 | Schmitter | 524/119 |

FOREIGN PATENT DOCUMENTS

| | | |
|---|---|---|
| 474308 | 11/1992 | European Pat. Off. |
| 474309 | 11/1992 | European Pat. Off. |
| 2311528 | 1/1997 | United Kingdom |
| 2311528A | 1/1997 | United Kingdom |

OTHER PUBLICATIONS

Chem Abstract: 128:23610 "Non–blooming stabilizer mixtures for polyamides, polyesters and polyketones" "Andre".
Search Report dated May 17, 1999.

*Primary Examiner*—Duc Truong

[57] ABSTRACT

A polymer composition made by combining a polyketone polymer and a phenolic alkylene dicarboxylate of the general formula:

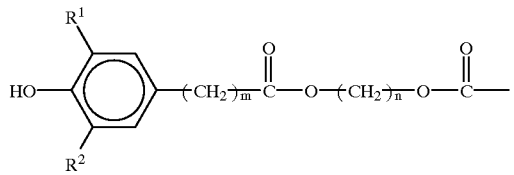

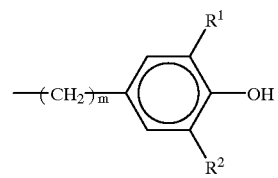

each $R^1$ independently is hydrogen or alkyl with 1–6 carbon atoms,
each $R^2$ independently is alkyl with 1–6 carbon atoms,
each m is an integer of 0–4, and
n is an integer of 2–12; and
a process for preparing these compositions.

21 Claims, No Drawings

POLYKETONE POLYMER COMPOSITION

BACKGROUND OF THE INVENTION

This invention relates to polyketone polymer compositions. More particularly, this invention relates to polyketone polymer compositions containing a stabilizer acting against heat degradation during their end-use.

Polymers of carbon monoxide and olefinically unsaturated compounds generally referred to as polyketones or polyketone polymers are well known in the art. The class of linear alternating polymers of carbon monoxide and at least one unsaturated compound are of particular interest among polyketone polymers. In the linear alternating polymers the units originating from carbon monoxide alternate with the units originating from the olefinically unsaturated compound(s). This class of polymers is disclosed in numerous patent documents, exemplified by U.S. Pat. No. 4,880,865 and U.S. Pat. No. 4,818,811.

EP-A-289077 discloses compositions of the poly-ketone polymers containing active phenolic stabilizers selected from a few small groups of narrowly defined additives. Phenolic stabilizers exemplified in the working examples of EP-A-289077 are triethyleneglycol bis[3-(3,5-di-tert-butyl-4-hydroxyphenyl)propanoate] and 1,6-bis[3-(3,5-di-tert-butyl-4-hydroxyphenyl)propaneamido]hexane. These stabilizers have in common a moiety of a phenolic carboxylic acid and they differ from each other in that one is a di-ester of triethylene glycol while the other is a di-amide derived from hexamethylenediamine. They give the polyketone polymer compositions an attractive level of stability against heat degradation during their end-use as judged from the retention of the mechanical properties. In the comparative examples of EP-A-289077 octadecyl 3-(3,5-di-tert-butyl-4-hydroxyphenyl)propanoate and pentaerythrityl tetrakis[3-(3,5-di-tert-butyl-4-hydroxyphenyl)propanoate] failed to show an attractive performance in the polyketone polymers. These additives are alkanol mono- and tetra-esters derived from a moiety of the same phenolic carboxylic acid.

Thus, it has correctly been said in EP-A-289077 that the invention in question relates to a selection of stabilizers from "a few small groups of narrowly defined additives".

The stabilised compositions described in EP-A-289077 have some practical problems associated with them. For example, compositions which contain triethyleneglycol bis [3-(3,5-di-tert-butyl-4-hydroxyphenyl)propanoate] are difficult in melt processing operations which extend over a longer period of time, for example a time in excess of one hour. In injection moulding trials the transport of polymer melt ceases due to slipping of the screw. Further, compositions which contain 1,6-bis[3-(3,5-di-tert-butyl-4-hydroxyphenyl)propaneamido]hexane and objects made of the compositions develop a yellow discoloration relatively rapidly when they are exposed to heat, such as during melt processing and during their end-use. Thus, there is a need for finding adequate stabilizers for the polyketone polymers which do not have the aforementioned disadvantages.

It is an unexpected finding that, despite the teaching of EP-A-289077, certain phenolic alkylene dicarboxylates, which are alkanol di-esters of the same type of phenolic carboxylic acid as mentioned above, not only provide an attractive level of stabilization of the polyketone polymer compositions against heat degradation with a much reduced tendency to yellow discoloration, they also provide polyketone polymer compositions with an attractive melt processing performance over an extended period of time, and with an attractive level of physical and mechanical properties.

The finding is indeed surprising as it was found that another phenolic alkylene dicarboxylate, namely the di-ester of 2,2-bis[4-(2-hydroxyethoxy)phenyl]propane and 3-(3,5-di-tert-butyl-4-hydroxyphenyl)propanoic acid, gave a level of stabilization against heat degradation which was even below that of octadecyl 3-(3,5-di-tert-butyl-4-hydroxyphenyl)propanoate and pentraerythrityl tetrakis[3-(3,5-di-tert-butyl-4-hydroxyphenyl)propanoatel, used in the comparative examples of EP-A-289077.

SUMMARY OF THE INVENTION

The present invention relates to a polymer composition comprising a polyketone polymer combined with a phenolic alkylene dicarboxylate of the general formula:

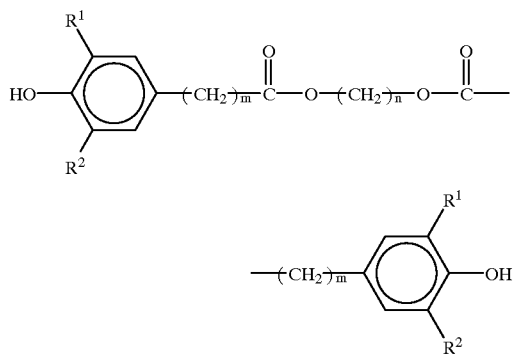

wherein
each $R^1$ independently is hydrogen or alkyl with 1–6 carbon atoms,
each $R^2$ independently is alkyl with 1–6 carbon atoms,
each m is an integer of 0–4, preferably 2, and
n is an integer of 2–12, preferably 4–8, in particular 6.

The invention further relates to a process for preparing the compositions according to this invention comprising admixing the polyketone polymer and a phenolic alkylene dicarboxylate as defined hereinbefore.

DETAILED DESCRIPTION OF THE INVENTION

The polyketones for use in this invention are typically linear alternating copolymers of carbon monoxide and at least one olefinically unsaturated compound. The linear alternating structure implies that the polymers contain one molecule of carbon monoxide for each molecule of the olefinically unsaturated compound. Olefinically unsaturated compounds comprise suitably up to 20 carbon atoms and include compounds which comprise exclusively carbon and hydrogen and compounds which in addition comprise hetero atoms, such as unsaturated esters, ethers and amides. Unsaturated hydrocarbons are preferred. Examples of suitable olefinically monomers are aliphatic α-olefins, such as ethene, propene, butene-1 and hexene-1, cyclic olefins such as cyclopentene, aromatic compounds, such as styrene and α-methylstyrene and vinyl esters, such as vinyl acetate and vinyl propionate. The preferred polyketone polymers are linear alternating polymers of carbon monoxide and ethene or linear alternating polymers of carbon monoxide, ethene and an olefinically unsaturated compound of at least 3 carbon atoms, particularly an α-olefin such as propene.

When the preferred polyketone polymers of carbon monoxide, ethene and another olefinically unsaturated compound are employed, there will be within the polymer typically at least 2 units incorporating a moiety of ethene for each unit incorporating a moiety of the other olefinically unsaturated compound(s). Preferably, there will be from 10 units to 100 units incorporating a moiety of ethene for each unit incorporating a moiety of the other olefinically unsaturated compound(s). The preferred polyketone polymers are therefore represented by the repeating formula

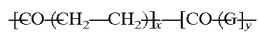

where G is the moiety of the olefinically unsaturated compound of at least 3 carbon atoms polymerized through the ethylenic unsaturation and the ratio of y:x is typically no more than 0.5, more typically from 0.01 to 0.1. When linear alternating polymers of carbon monoxide and ethene only are employed in the compositions of the invention, there will be no second olefinically unsaturated compound present and the polymers are represented by the above formula wherein y is zero. When y is other than zero the —CO—(CH$_2$—CH$_2$)— units and the —CO—(G)—units are found randomly throughout the polymer chain. The precise nature of the end groups does not appear to influence the properties of the polymer to any considerable extent so that the polymers are fairly represented by the formula for the polymer chains as depicted above.

The polyketone polymers of number average molecular weight from 1,000 to 200,000, particularly those of number average molecular weight from 20,000 to 90,000 as determined by gel permeation chromatography are of particular interest. The physical properties of the polymer will depend in part upon the molecular weight, whether the polymer is based on a single or on a plurality of olefinically unsaturated compounds and on the nature and the proportion of the olefinically unsaturated compounds. Typical melting points for the polymers are from 175° C. to 300° C., more typically from 210° C. to 270° C., as determined by differential scanning calorimetry. The polymers have typically a limiting viscosity number (LVN), measured in m-cresol at 60° C. in a standard capillary viscosity measuring device, from 0.5 dl/g to 10 dl/g, more typically from 0.8 dl/g to 4 dl/g.

Preferred methods for the production of the polyketone polymers are known from U.S. Pat. No. 4,808,699 and U.S. Pat. No. 4,868,282. U.S. Pat. No. 4,808,699 teaches the production of polyketone polymers by contacting ethene and carbon monoxide in the presence of a catalyst comprising a Group VIII metal compound, an anion of a nonhydrohalogenic acid with a pKa less than 6 and a bidentate phosphorus, arsenic or antimony ligand. U.S. Pat. No. 4,868,282 teaches the production of polyketone polymers by contacting carbon monoxide and ethene in the presence of one or more hydrocarbons having an olefinically unsaturated group with a similar catalyst.

With respect to the phenolic alkylene dicarboxylates of this invention, preference is given to phenolic alkylene dicarboxylates in which R$^2$ is an alkyl group that causes steric hindrance. In more preferred phenolic alkylene dicarboxylates R$^1$ and R$^2$ are the same or different sterically hindering alkyl groups. Examples of sterically hindering alkyl groups are isopropyl, isobutyl, isoamyl, tert-butyl, tert-amyl and cyclohexyl groups.

Examples of the phenolic alkylene dicarboxylates according to this invention are:

1,2-ethylene bis(2-[3-pentyl-4-hydroxyphenyl] ethanoate), 1,4-tetramethylene bis(2-[3,5-diethyl-4-hydroxyphenyl] ethanoate), 1,4-tetramethylene bis(5-[3-isobutyl-4-hydroxyphenyl] pentanoate), 1,6-hexamethylene bis(3-[3,5-di-tert-butyl-4-hydroxyphenyl]propanoate), 1,12-dodecamethylene bis(2-[3,5-di-tert-amyl-4-hydroxyphenyl]ethanoate), 1,6-hexamethylene bis(3-[3,5-di-isobutyl-4-hydroxyphenyl]propanoate), 1,8-octamethylene bis(3-[3,5-di-tert-butyl-4-hydroxyphenyl]propanoate), 1,8-octamethylene bis(2-[3-pentyl-4-hydroxyphenyl] ethanoate), 1,10-decamethylene bis(3-ethyl-5-tert-butyl-4-hydroxybenzoate), 1,10-decamethylene bis(2-[3-isopropyl-5-tert-amyl-4-hydroxyphenyl]ethanoate), 1,6-hexamethylene bis(4-[3-cyclohexyl-4-hydroxyphenyl]butanoate).

A most suitable phenolic alkylene dicarboxylate for use in this invention is 1,6-hexamethylene bis(3-[3,5-di-tert-butyl-4-hydroxyphenyl]propanoate), which are available from Ciba Specialty Chemicals under the trademarks "IRGANOX 249" and "IRGANOX 259".

The compositions of this invention are made by admixing a quantity of the phenolic alkylene dicarboxylate with the polyketone polymer. Suitably the quantity of the dicarboxylate amounts to 0.01–10% w, relatively to the weight of the polyketone polymer. More suitably this quantity is 0.05–5% w, and in particular 0.1–3% w, on the same basis.

Other polymer additives, well known in the art, can be used as a further component of the polyketone compositions of this invention. For instance, fillers, extenders, lubricants, pigments, plasticizers and other (polymeric) materials can be added to the polyketone compositions being stabilized to improve or otherwise alter the properties of the compositions.

However, it is preferred that alkanolamine esters of diaryl phosphites are not used as stabilisers in the compositions of this invention, which means that they will not be present or, if present, that they are present in a quantity of less than 0.05% w, in particular less than 0.01% w, more in particular less than 0.005% w, based on the weight of the polyketone polymer. This relates in particular to 2,2',2"-nitrilotriethanol-tris(3,3',5,5'-tetra-tert-butyl-1,1'-biphenyl-2,2'-diyl)-phosphite, disclosed in U.S. Pat. No. 4,318,845. It has been found that without such compounds being present the compositions of this invention have better stability under the conditions of melt processing, such as extrusion and injection moulding, i.e. they better retain the melt viscosity and the colour.

It is preferred that the polyketone compositions contain a glass fibre reinforcement, in particular a glass fibre reinforcement which comprises a sizing of aminosilane and uncured epoxy resin functionalities or a sizing of aminosilane and polyurethane functionalities. The glass fibre reinforcement is typically present in a quantity of 1–100% w, relative to the weight of the polyketone polymer. Such glass fibre reinforcements have been disclosed in EP-A-474308 and EP-A-474309.

The phenolic alkylene dicarboxylate may be incorporated into the polyketone polymer at any stage of the polymer's processing, preferably prior to being subjected to elevated temperature. Any of the conventional methods suitable for forming a mixture of the polymer and phenolic alkene dicarboxylate may be used to form the mixture so long as the method results in a substantially uniform blend of the composition components. Such methods are well known in the art; they are in general melt processing methods and may include dry blending of the polymer and the phenolic alkene dicarboxylate in a finely divided form followed by melt extrusion of the mixture. Techniques such as solvent deposition may also be used. The polyketone polymer compositions, including those which contain a glass fibre reinforcement, have attractive melt flow properties (viscosity).

The stabilized polyketones formed in this manner can be processed into articles of manufacture such as fibres, sheets, films, laminates, containers, tubes, piping and articles having an intricate shape by conventional processing methods, such as melt spinning, extrusion, blow-moulding, injection moulding, compression moulding, and solid phase pressure forming. The polyketone polymer compositions of this invention are in particular suitable for use in melt processing during a longer period of time, such as in injection moulding of a large series of articles. The invention is also of special importance to those applications which require adequate stability of the polyketone polymer against heat degradation during end-use (i.e., good performance in the retention of the physical and mechanical properties and the absence of surface cracking) This invention is of particular importance to applications which demand a high level of physical and mechanical properties of the polyketone compositions, with or without glass fibre reinforcement. The relevant mechanical properties are, for example, the tensile and flexural properties (moduli, stress and strain at break, stress and strain at yield, if yielding, which depends on the presence of e.g. glass fibre reinforcement, etc.), low temperature impact resistance, e.g. at −30° C., and ductile/brittle transition temperature. Relevant physical properties are, for example, colour, dielectric properties, comparative tracking index.

The invention is now illustrated by means of the following nonlimiting working examples.

EXAMPLE 1

A linear alternating copolymer of carbon monoxide, ethene and propene having a melting point of 220° C. and a limiting viscosity number of 1.8 dl/g, measured in m-cresol at 60° C., was dry blended with 0.2% w of 1,6-hexamethylene bis(3-[3,5-di-tert-butyl-4-hydroxyphenyl] propanoate), based on the weight of the polymer. The dry blend was extruded into nibs; during the extrusion the melt temperature was 265° C. The nibs obtained were compression moulded at 250° C. into 1 mm thick sheets. The sheets were cut into 10×110 mm strips. These strips were aged by placing them in a circulating air oven which was kept at 125° C. At regular time intervals strips were removed from the oven and tested by bending by hand over a rounded edge over 90 degrees in both directions. Breaking of the strip upon bending indicated failure by embrittlement as a result of degradation.

An attractive performance was found with respect to embrittlement and discoloration, compared with the results of comparative tests which were carried out in the same manner as this Example, but with other additives. In particular, the samples which contained 1,6-hexamethylene bis-(3-[3,5-di-tert-butyl-4-hydroxyphenyl]propanoate) developed less colour during the heat treatments than samples which contained 1,6-bis[3-(3,5-di-tert-butyl-4-hydroxyphenyl)propaneamido]hexane, employing otherwise the same conditions.

EXAMPLE 2

The stabilized polyketone composition as obtained in Example 1 in the form of nibs was used in an injection moulding trial for the production of specimen for the testing of mechanical properties. The injection moulding machine operated under the following conditions: barrel temperature 250° C., shot size 10 g, medium injection speed, cycle time 18 s. The trial was continued for 3 hours without interruption, and without meeting any difficulties.

EXAMPLE 3 (for comparison)

Example 2 was repeated, except that the polyketone contained, based on the weight of the polymer, 0.2% w of triethyleneglycol bis(3-(3,5-di-tert-butyl-4-hydroxyphenyl) propanoate] instead of 1,6-hexamethylene bis(3-[3,5-di-tert-butyl-4-hydroxyphenyl]propanoate). After one hour the injection moulding trial could not be continued because slipping of the screw caused that there was no further transportation of the melt.

What is claimed is:

1. A polymer composition, comprising:
   a polyketone polymer;
   a phenolic alkylene dicarboxylate of the formula:

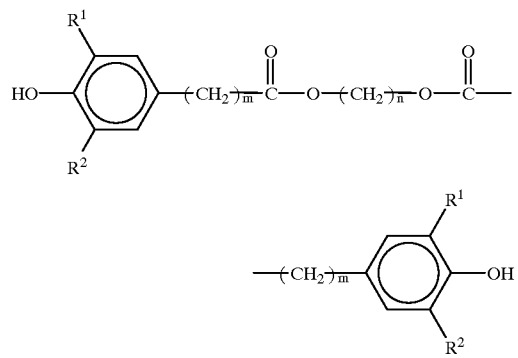

wherein each $R^1$ independently is hydrogen or alkyl with 1–6 carbon atoms, each $R^2$ independently is alkyl with 1–6 carbon atoms, each m is an integer of 0–4, and n is an integer of 2–12; and
   less than 0.01% w, 2,2',2"-nitrilo-triethanol-tris(3,3',5,5'-tetra-tert-butyl-1,1'-biphenyl-2,2'-diyl)-phosphite based on the weight of the polyketone polymer.

2. The composition as claimed in claim 1, wherein the phenolic alkylene dicarboxylate is selected such that $R^1$ and $R^2$ are independently selected from isopropyl, isobutyl, isoamyl, tert-butyl, tert-amyl and cyclohexyl groups, m is 2 and n is in the range of 4–8.

3. The composition as claimed in claim 2, wherein the phenolic alkylene dicarboxylate is 1,6-hexamethylene bis (3-(3,5-di-tert-butyl-4-hydroxyphenyl)propanoate).

4. The composition as claimed in claim 1, wherein the quantity of the phenolic alkylene dicarboxylate is 0.05–5% w, relative to the weight of the polyketone polymer.

5. The composition as claimed in claim 4, wherein the quantity of the phenolic alkylene dicarboxylate is 0.1–3% w, relative to the weight of the polyketone polymer.

6. The composition of claim 1, wherein the 2,2',2"-nitrilotriethanol-tris-(3,3',5,5"-tetra-tert-butyl-1,1'-biphenyl-2,2'-diyl)-phosphite is below detection limits.

7. The composition as claimed in claim 1, further comprising a glass fiber reinforcement which comprises a sizing of aminosilane and uncured epoxy resin functionalities or a sizing of aminosilane and polyurethane functionalities.

8. The composition as claimed in claim 7, wherein the glass fiber reinforcement is present in a quantity of 1–100% w, relative to the weight of the polyketone polymer.

9. The composition as claimed in claim 1, wherein the polyketone polymer is represented by the repeating formula:

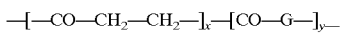

where G is the moiety of an olefinically unsaturated compound of at least 3 carbon atoms polymerized through the ethylenic unsaturation and the ratio of y:x is no more than 0.5.

10. A process for preparing polyketone polymer compositions, which process comprises admixing a polyketone polymer and a phenolic alkylene dicarboxylate having the formula:

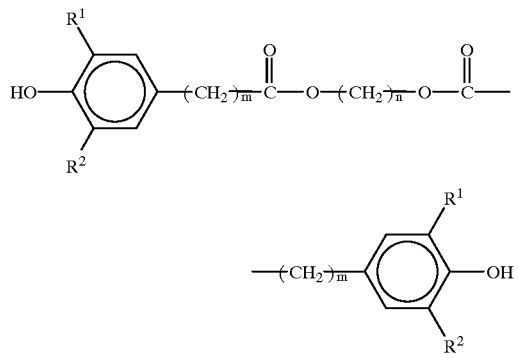

wherein each $R^1$ independently is hydrogen or alkyl with 1–6 carbon atoms, each $R^2$ independently is alkyl with 1–6 carbon atoms, each m is an integer of 0–4, and n is an integer of 2–12, wherein the composition contains less than 0.01% w, 2,2',2"-nitrilo-triethanol-tris (3,3',5,5'-tetra-tert-butyl-1,1'-biphenyl-2,2'-diyl)-phosphite based on the weight of the polyketone polymer.

11. The product of the process of claim 10.

12. A polymer composition comprising:

a polyketone polymer represented by the repeating formula:

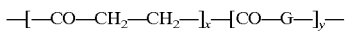

where G is the moiety of an olefinically unsaturated compound of at least 3 carbon atoms polymerized through ethylenic unsaturation and the ratio of y:x is no more than 0.5; and, a phenolic alkylene dicarboxylate of the formula:

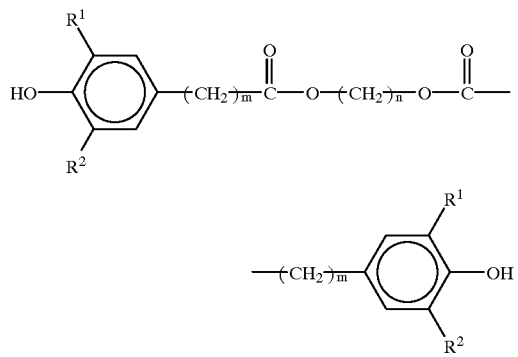

wherein each $R^1$ independently is hydrogen or alkyl with 1–6 carbon atoms, each $R^2$ independently is alkyl with 1–6 carbon atoms, each m is an integer of 0–4, and n is an integer of 2–12 wherein the composition comprises less than 0.01% w, 2,2',2"-nitrilo-triethanol-tris (3,3',5,5'-tetra-tert-butyl-1,1'-biphenyl-2,2'-diyl)-phosphite based on the weight of the polyketone polymer.

13. A polymer composition comprising:

a polyketone polymer represented by the repeating formula:

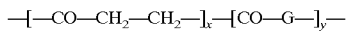

where G is the moiety of an olefinically unsaturated compound of at least 3 carbon atoms polymerized through ethylenic unsaturation and the ratio of y:x is no more than 0.5; and, a phenolic alkylene dicarboxylate of the formula:

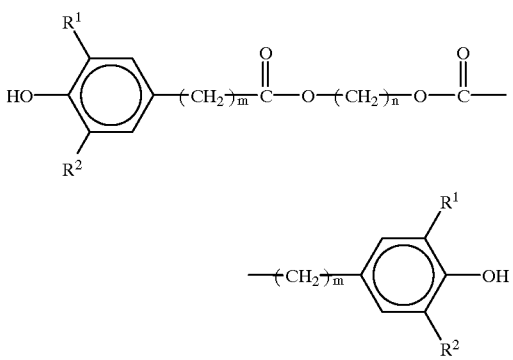

wherein each $R^1$ independently is hydrogen or alkyl with 1–6 carbon atoms, each $R^2$ independently is alkyl with 1–6 carbon atoms, each m is an integer of 0–4, and n is an integer of 2–12 wherein the quantity of the phenolic alkylene dicarboxylate is 0.05–5% w, relative to the weight of the polyketone polymer, and wherein the composition comprises no 2,2',2"-nitrilo-triethanol-tris(3,3',5,5'-tetra-tert-butyl-1,1'-biphenyl-2,2'-diyl)-phosphite.

14. A polymer composition, consisting essentially of a polyketone polymer combined with a phenolic alkylene dicarboxylate of the formula:

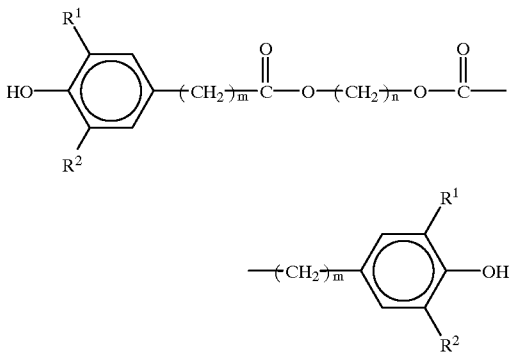

wherein each $R^1$ independently is hydrogen or alkyl with 1–6 carbon atoms, each $R^2$ independently is alkyl with 1–6 carbon atoms, each m is an integer of 0–4, and n is an integer of 2–12.

15. A composition as claimed in claim 14, wherein the phenolic alkylene dicarboxylate is selected such that $R^1$ and $R^2$ are independently selected from isopropyl, isobutyl, isoamyl, tert-butyl, tert-amyl and cyclohexyl groups, m is 2 and n is in the range of 4–8.

16. The composition as claimed in claim 15, wherein the phenolic alkylene dicarboxylate is 1,6-hexamethylene bis (3-(3,5-di-tert-butyl-4-hydroxyphenyl)propanoate).

17. The composition as claimed in claim 14, wherein the quantity of the phenolic alkylene dicarboxylate is 0.05–5% w, relative to the weight of the polyketone polymer.

18. The composition as claimed in claim 17, wherein the quantity of the phenolic alkylene dicarboxylate is 0.1–3% w, relative to the weight of the polyketone polymer.

19. The composition as claimed in claim 14, further comprising a glass fiber reinforcement which comprises a sizing of aminosilane and uncured epoxy resin functionalities or a sizing of aminosilane and polyurethane functionalities.

20. The composition as claimed in claim 19, wherein the glass fiber reinforcement is present in a quantity of 1–100% w, relative to the weight of the polyketone polymer.

21. The composition as claimed in claim 14, wherein the polyketone polymer is represented by the repeating formula:

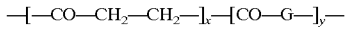

where G is the moiety of an olefinically unsaturated compound of at least 3 carbon atoms polymerized through the ethylenic unsaturation and the ratio of y:x is no more than 0.5.

* * * * *